UNITED STATES PATENT OFFICE.

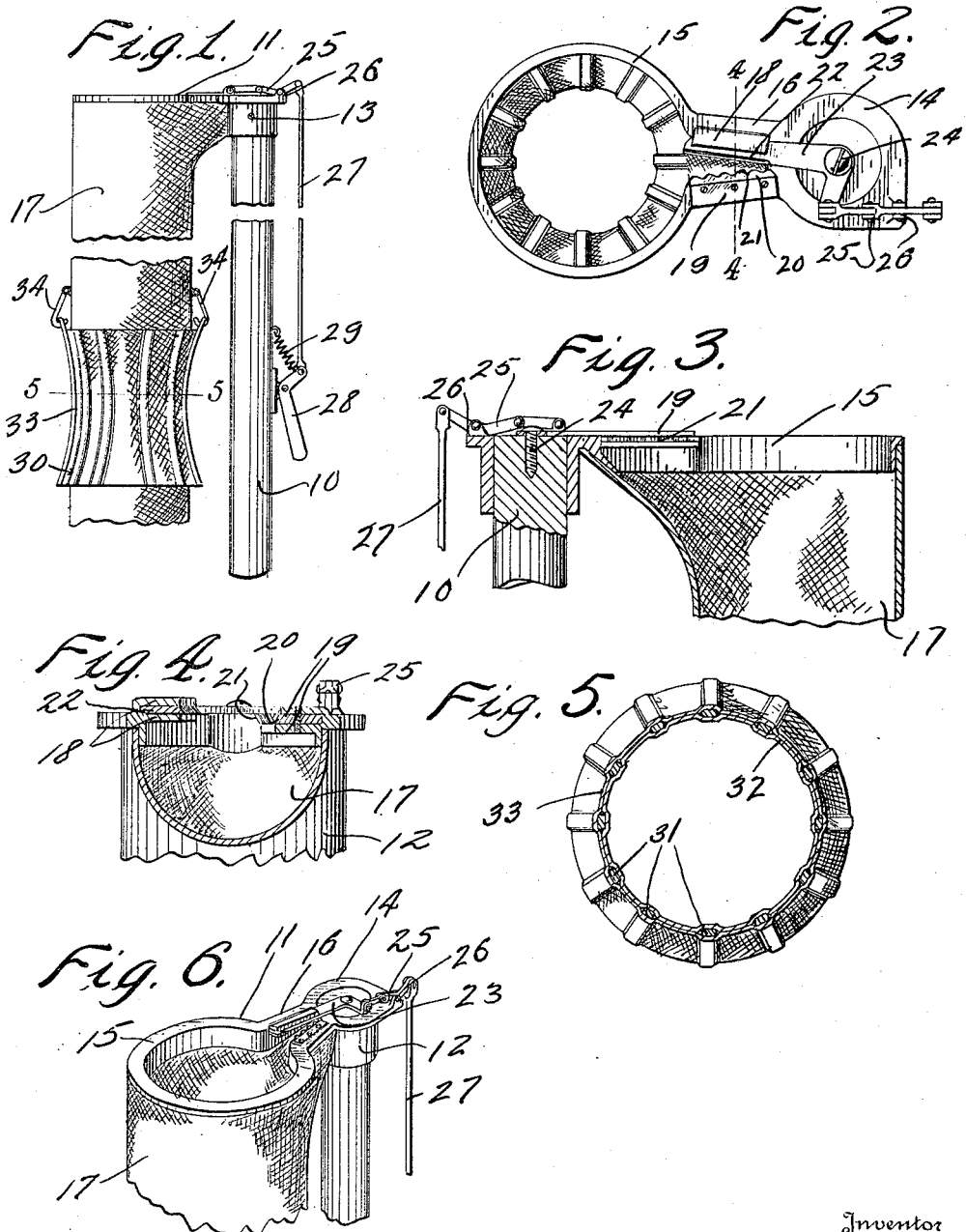

EMIL C. GOUSSY, OF SOUTH SAGINAW, MICHIGAN.

FRUIT-PICKER.

1,303,885.     Specification of Letters Patent.     Patented May 20, 1919.

Application filed June 28, 1917, Serial No. 177,613. Renewed March 31, 1919. Serial No. 286,552.

*To all whom it may concern:*

Be it known that I, EMIL C. GOUSSY, a citizen of the United States, residing at South Saginaw, in the county of Saginaw, State of Michigan, have invented certain new and useful Improvements in Fruit-Pickers; and I do hereby declare the following to be a full, clear, and exact description of the invention, such as will enable others skilled in the art to which it appertains to make and use the same.

This invention is an improvement in agricultural implements and has particular reference to a fruit picker.

An object of the invention is to provide a simple and improved construction for supporting the flexible conveyer tube from the handle of the implement and forming a portion of the cutting device for severing the stems of the fruit.

Another object is to provide an improved means for retarding or cushioning the passage of fruit through the conveyer tube after being severed whereby to prevent injury thereto.

A further object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of the implement constructed in accordance with the invention.

Fig. 2 is a top plan view thereof.

Fig. 3 is a vertical sectional view.

Fig. 4 is a section on the line 4—4 of Fig. 2.

Fig. 5 is a section on the line 5—5 of Fig. 1.

Fig. 6 is a perspective view of the supporting frame or casting carried by the handle of the implement.

In the drawing, the numeral 10 indicates the handle of the device, the upper end of which carries a supporting frame or casting generally indicated by the numeral 11 and including a socket or sleeve member 12 for receiving the upper end of the handle and being secured thereto by a bolt 13. The frame 11 further comprises a pair of ring members 14 and 15 with a contracted or neck portion 16 therebetween, the ring member 14 encircling the upper end of the handle 10 while the ring member 15 has secured thereto the upper end of the flexible conveyer tube 17 for receiving the fruit after the same has been severed.

The inner edges of the contracted portion 16 of the frame are preferably provided with oppositely disposed flanges or lips 18 and 19 formed, respectively, upon the opposite edges, the latter flanges have secured therebetween the fixed cutting blade 20 having the serrated edge 21. The opposite flanges 18 receive therebetween the movable blade 22 which forms one of the arms of a bell crank lever 23 pivoted at 24 and movable about an axis extending longitudinally of the handle 10. The other arm of the lever 23 is connected to one arm of a second bell crank lever 25 pivoted at 26 and connected by a rod 27 to an operating lever 28 pivoted to the handle 10 and retained in normal position by a spring 29 interposed between said handle and the lever. It will be apparent from this construction that when the lever 28 is operated against the tension of the spring 29 the levers 25 and 23 will be swung about their pivots and the cutting blade 22 will be adjusted toward the blade 20 and thus sever the stems of fruit between said blades.

After the fruit has been severed it is desirable that the passage thereof through the tube 17 be retarded or cushioned so as to prevent injury to the fruit and for this purpose use is preferably made of a cushioning device generally indicated by the numeral 30 and consisting of a plurality of longitudinally extending ribs 31 forming the frame work of the device and having a cover 32, said ribs being bent so as to provide said device with an intermediate contracted portion 33 which is of a diameter less than that of the tube 17 so that the fruit passing through the tube 17 will contact the contracted portion of the device 30 and thus have its movement through said tube retracted. The device 30 is preferably suspended on the tube 17 by means of hooks or catches 34 carried by the upper end of the device and engaging said tube.

What is claimed is:—

1. A fruit picker comprising a handle, a frame supported thereby and having a sleeve for receiving the upper end of said handle, said frame including a pair of ring members having a contracted portion therebetween, a stationary cutting blade mounted in said contracted portion, a lever pivoted to said handle and having one arm thereof shaped to provide a cutting blade, operating means for said lever causing the cutting blade thereof to coöperate with said stationary blade to sever the stems of fruit, and a flexible conveyer tube supported by one of said ring members.

2. A fruit picker comprising a handle, a frame supported thereby and having a sleeve for receiving the upper end of said handle, said frame including a pair of ring members having a contracted portion therebetween, a stationary cutting blade mounted in said contracted portion, a lever pivoted to said handle and having one arm thereof shaped to provide a cutting blade, operating means for said lever causing the cutting blade thereof to coöperate with said stationary blade to sever the stems of fruit, opposed flanges extending longitudinally of said contracted portion for receiving said blades therebetween, and a flexible conveyer tube supported by one of said ring members.

In testimony whereof, I affix my signature in the presence of two witnesses.

EMIL C. GOUSSY.

Witnesses:
J. M. SHAFFER,
JOHN C. SHAFFER.

Copies of this patent may be obtained for five cents each, by addressing the "Commissioner of Patents, Washington, D. C."